(12) United States Patent
Satake

(10) Patent No.: US 7,395,957 B2
(45) Date of Patent: Jul. 8, 2008

(54) IMAGE PROCESSING APPARATUS

(75) Inventor: Makoto Satake, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 10/925,595

(22) Filed: Aug. 25, 2004

(65) Prior Publication Data

US 2005/0045711 A1 Mar. 3, 2005

(30) Foreign Application Priority Data

Aug. 28, 2003 (JP) ............................. 2003-304927

(51) Int. Cl.
G06F 17/00 (2006.01)
(52) U.S. Cl. ..................................... 235/375
(58) Field of Classification Search ................ 235/375; 707/1, 100, 102; 358/1.14, 1.15
See application file for complete search history.

(56) References Cited

U.S. PATENT DOCUMENTS

| | | | | |
|---|---|---|---|---|
| 6,061,142 | A * | 5/2000 | Shim | 358/1.14 |
| 6,825,958 | B1 * | 11/2004 | Fukasawa et al. | 358/523 |
| 7,088,462 | B2 * | 8/2006 | Bhogal et al. | 358/1.15 |
| 2002/0089690 | A1 * | 7/2002 | Boyce | 358/1.15 |
| 2005/0091287 | A1 * | 4/2005 | Sedlar | 707/200 |

FOREIGN PATENT DOCUMENTS

| | | |
|---|---|---|
| JP | 11-0331757 | 11/1999 |
| JP | 2000-181674 A | 6/2000 |
| JP | 2001-229091 A | 8/2001 |
| JP | 2003-076638 A | 3/2003 |

OTHER PUBLICATIONS

Internet article "How Windows Manages Files" by Victor Laurie at http://vlaurie.com/computers2/extensions1.htm.*
Internet article "Windows File Associations" by Mary Landesman at http://antivirus.about.com/od/windowsbasics/l/blfileassoc.htm.*
Internet article "Understanding MS Windows File Associations" by Brien M. Posey at http://www.microsoft.com/technet/archive/win98/maintain/assoc.mspx.*
Internet article "How to Associate Files and Extensions" at http://www.geocities.com/Athens/Troy/6883/associatext.html.*
Internet Archive (http://www.archive.org) results for website http://www.geocities.com/Athens/Troy/6883/associatext.html.*

* cited by examiner

*Primary Examiner*—Daniel A Hess
(74) *Attorney, Agent, or Firm*—Canon U.S.A. Inc., IP Division

(57) ABSTRACT

An image processing apparatus comprises a read unit for reading a data file stored in a storage medium which is removably loaded into an apparatus body, a determining unit for determining a file type of the data file read out of the storage medium, and a processing control unit for executing predetermined processing corresponding to the determined file type. When a data file to be processed is selected from the storage medium, a file type of the selected data file is determined and the predetermined processing corresponding to the determined file type is executed. Just by selecting the data file stored in the storage medium or the file type, the data file is automatically processed in the operation mode or the print mode corresponding to the file type. Operability in processing data files is improved.

5 Claims, 4 Drawing Sheets

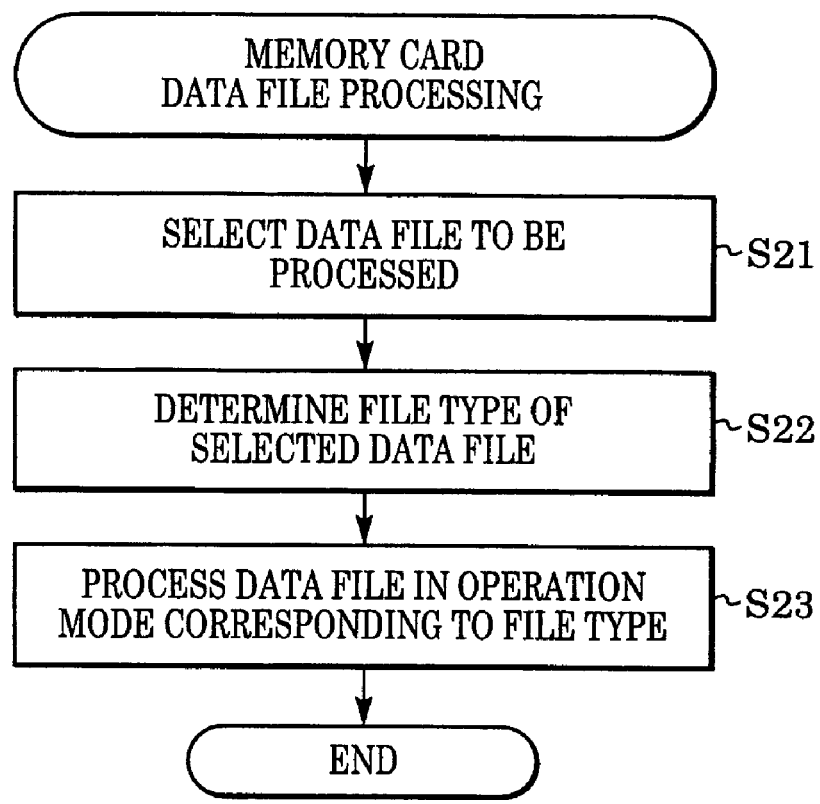

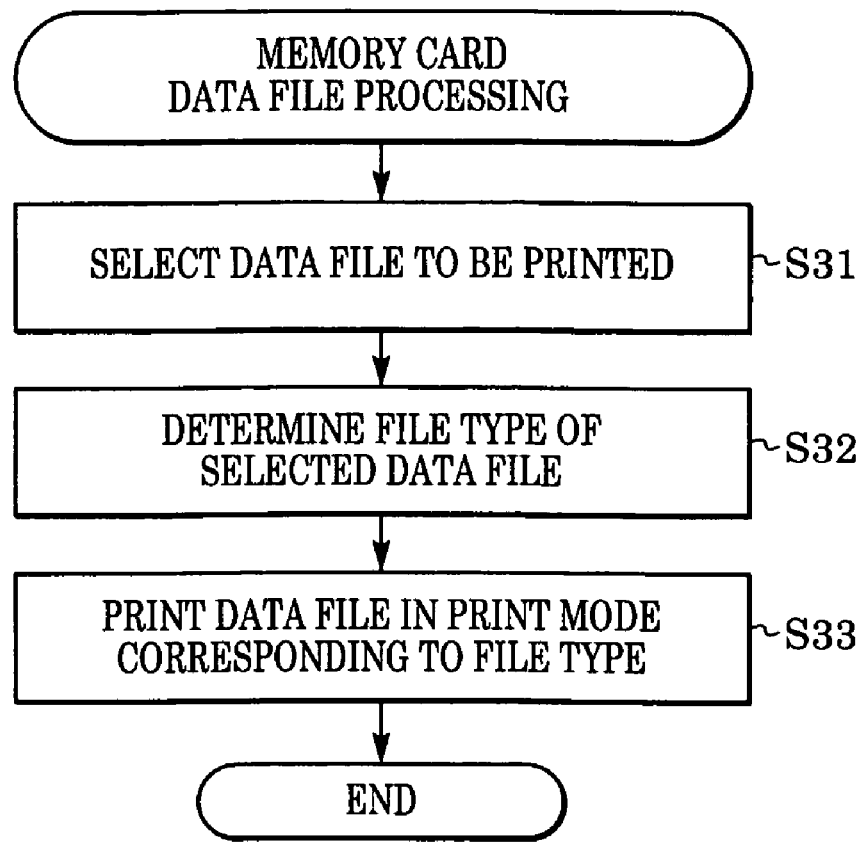

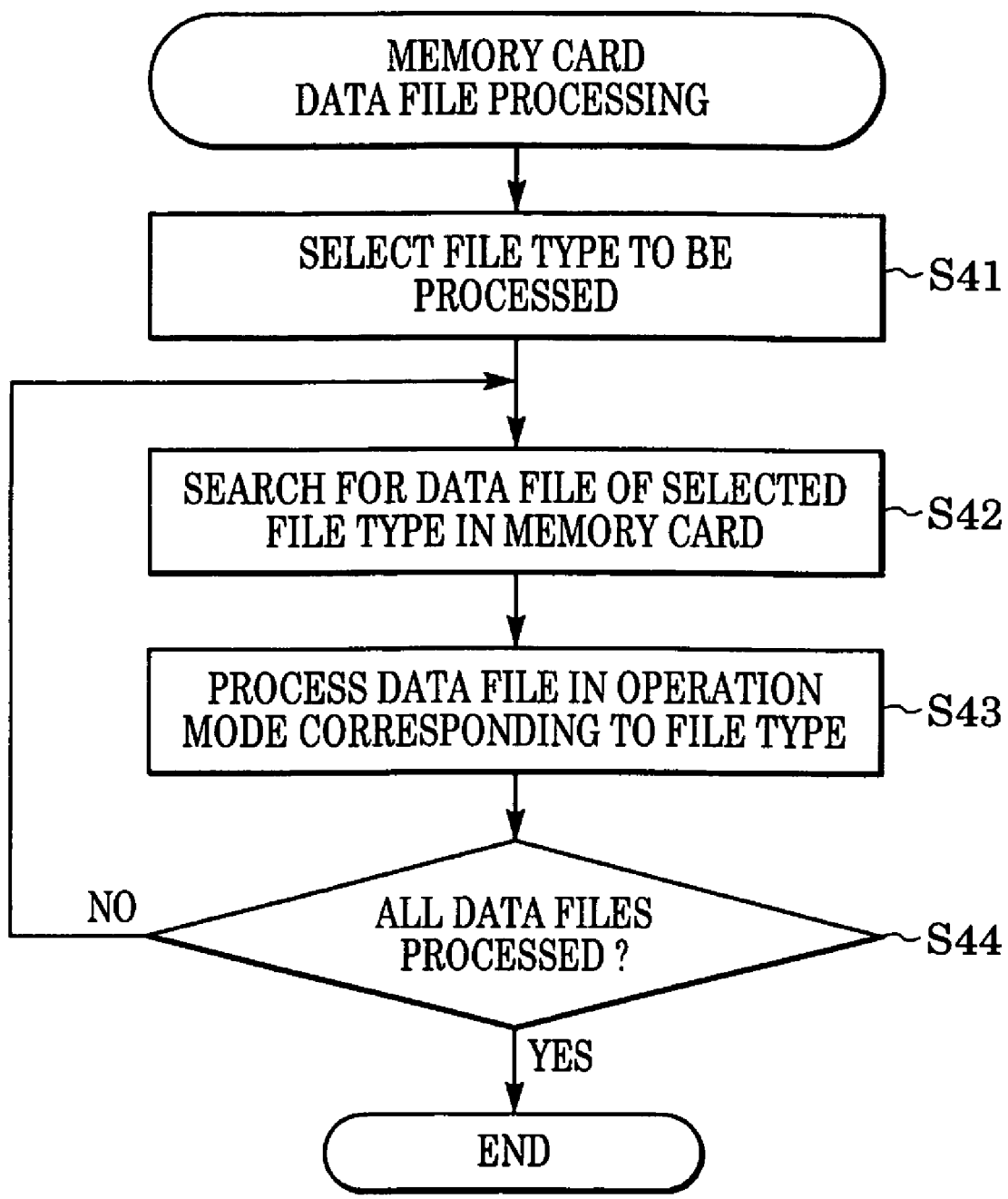

IMAGE PROCESSING APPARATUS

BACKGROUND OF THE INVENTION

1. Field of the Invention

The present invention relates to an image processing apparatus for reading data stored in a storage medium, such as a memory card, and executing predetermined processing of the read data.

2. Description of the Related Art

In recent years, rapidly expanding use of digital equipment, such as a personal computer (hereinafter abbreviated to a "PC"), a digital still camera (DSC), a PDA (Personal Digital Assistance), and a cell phone, has quickly increased a demand for storage media for storing image data, such as a memory card. Also, with increased variety and network adaptability of the digital equipment having data input/output terminals, various types of data files including JPEG, text, TIFF and WAVE, are handled using storage media.

Under such background, a printer, a composite machine, etc. having the read/write-enable function with respect to a storage medium, such as a memory card, has been developed so that print, FAX transmission, LCD display, and voice output can be directly made from the storage medium with no aid of PC.

One known composite machine having that function comprises a data reading unit for reading a plurality of original image data from a removable image storage medium which stores the plurality of original image data, an image synthesizing unit for synthesizing an image per color component from the read original image data, and an image forming unit for forming, on a recording material, the images of respective color components synthesized by the image synthesizing unit in a plane-sequential manner, the image synthesizing unit employing the image storage medium as a work memory (see, e.g., Patent Reference 1: Japanese Patent Laid-Open No. 11-331757).

In the composite machine having various functions including print, however, a liquid crystal display (LCD) has a smaller display area and the number of keys is smaller as compared with PC. Therefore, key-in operation is complex and operability is poor when trying to read various types of data files stored in the storage medium and to display the processing procedure adapted for the type of the read data file.

SUMMARY OF THE INVENTION

It is an object of the present invention to provide an image processing apparatus in which, with the functions of reading a data file stored in a storage medium and determining or searching for a type of data file (hereinafter referred to as a "file type"), processing adapted for the file type can be performed with simple operation.

To achieve the above object, the present invention provides an image processing apparatus comprising a read unit for reading a data file stored in a storage medium which is removably loaded into a body of the image processing apparatus; a determining unit for determining a file type of the data file read out of the storage medium; and a processing control unit for executing predetermined processing corresponding to the determined file type, wherein when a data file to be processed is selected from the storage medium, a file type of the selected data file is determined and the predetermined processing corresponding to the determined file type is executed.

According to the present invention, just by selecting the data file stored in the storage medium or the file type, processing of the data file is automatically executed in the operation mode or the print mode adapted for the selected file type. As a result, operability can be improved when processing any data files in the storage medium.

Further objects, features and advantages of the present invention will become apparent from the following description of the preferred embodiments with reference to the attached drawings.

BRIEF DESCRIPTION OF THE DRAWINGS

FIG. 2 is a flowchart of memory card data file processing employed in the image processing apparatus according to a first embodiment of the present invention.

FIG. 3 is a table showing the correspondence relationship between the file type and the operation mode in the first embodiment of the present invention.

FIG. 4 is a flowchart of memory card data file processing employed in the image processing apparatus according to a second embodiment of the present invention.

FIG. 5 is a table showing the correspondence relationship between the file type and the print mode in the second embodiment of the present invention.

FIG. 6 is a flowchart of memory card data file processing employed in the image processing apparatus according to the embodiment of the present invention.

DESCRIPTION OF THE PREFERRED EMBODIMENTS

Figure 1:
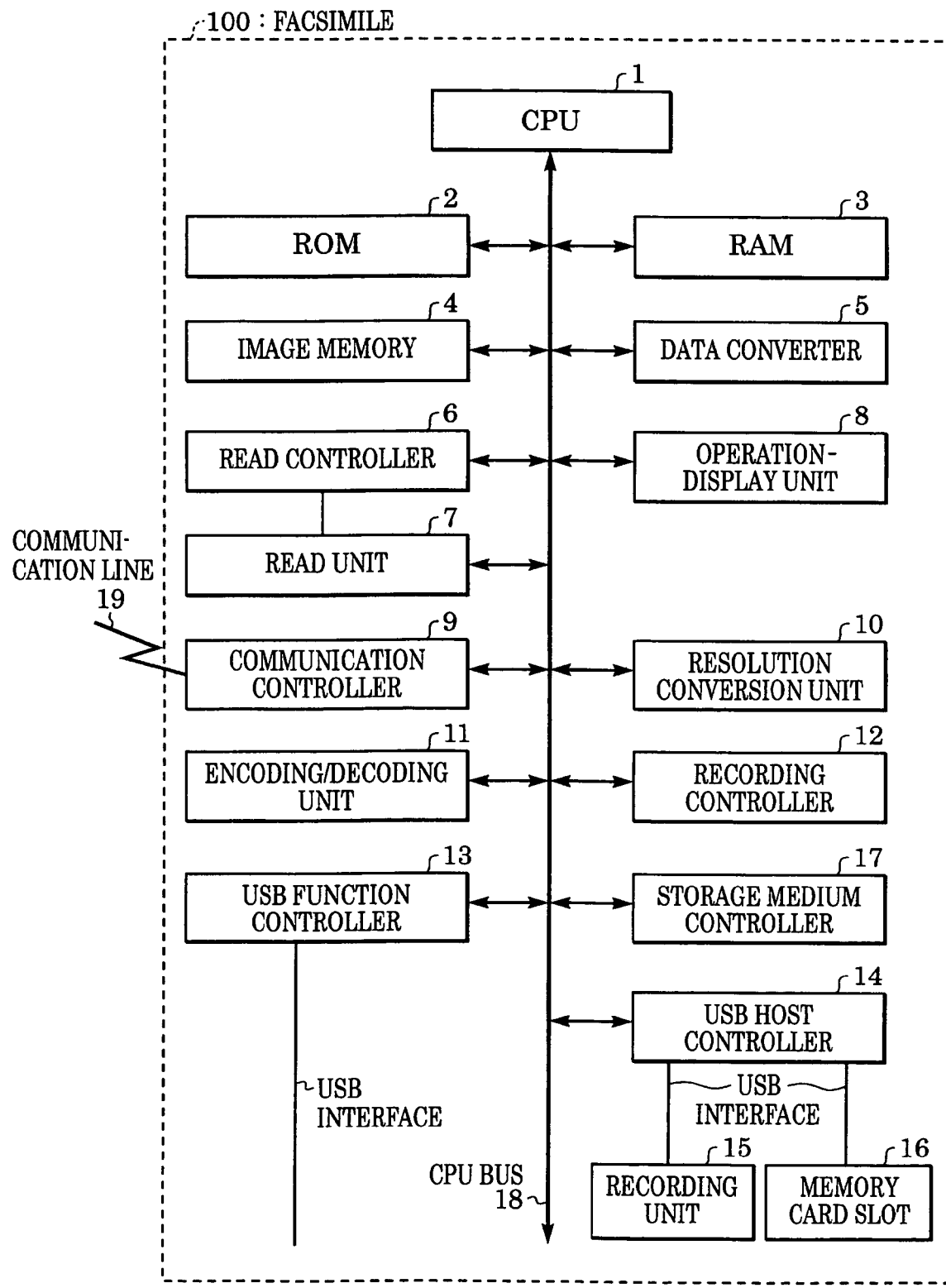
FIG. 1 is a block diagram of a facsimile to which an image processing apparatus according to one embodiment of the present invention is applied.

FIG. 1 is a block diagram of a facsimile 100 according to one embodiment of the present invention.

In the facsimile 100, a CPU 1 constitutes a system controller incorporated in the facsimile 100 and controls the entirety of the facsimile 100.

A ROM 2 stores various control programs executed by the CPU 1, a built-in operating system (OS) program, etc. The various control programs stored in the ROM 2 execute software control, such as scheduling and task switches, under management of the built-in OS stored in the ROM 2.

A RAM 3 is constituted by a SRAM (static RAM) or the like, and stores program control variables, etc. Also, the RAM 3 stores setting values registered by an operator, management data for the facsimile 100, etc., and includes various work buffer areas.

An image memory 4 is constituted by a DRAM (dynamic RAM) or the like, and accumulates image data.

A data converter 5 analyzes the page description language (PDL), etc. It also executes CG (computer graphics) development of character data, conversion of image data, etc.

A read controller 6 executes, with the aid of an image processing controller (not shown), various kinds of image processing, such as binary coding and halftone processing, on image signals which have been obtained by a read unit 7 through steps of optically reading a document by a contact image sensor (CIS) and converting read data into electrical image data, and then outputs a highly-fine image data. The read controller 6 is adaptable for two control methods, i.e., a sheet read control method of reading an original document while feeding it, and a book read control method of scanning an original document placed on a document glass.

An operation-display unit 8 comprises an operation unit including numeral input keys, character input keys, a onetouch phone number key, a mode setting key, a decision key, a cancel key, etc., and enabling a user to decide data of the destination for image transmission and to register setting data, and a display unit made up of various keys, LED's (light emitting diodes), an LCD, etc. and providing display of various input operations entered by the operator, operating and other statuses of the facsimile 100, etc.

A communication controller 9 is constituted by a MODEM (Modulation/Demodulation unit), an NCU (Network Control Unit), etc. The communication controller 9 is connected to an analog communication line (PSTN) 19 and executes communication control in accordance with T30 protocols, line control in procedures for originating and receiving a call to and from the communication line, etc.

A resolution conversion unit 10 executes resolution conversion control of image data, such as millimeter-inch resolution conversion. The resolution conversion unit 10 is also able to execute scaling-up and -down of image data.

An encoding/decoding unit 11 executes the processes for encoding/decoding and the scaling-up and -down of image data (including MH, MR, M-MR, JBIG and JPEG) handled in the facsimile 100.

A recording controller 12 executes, with the aid of the image processing controller (not shown), various kinds of image processing, such as smoothing, recording density compensation and color compensation, on the image data to be printed for conversion into highly-fine image data, and then outputs the converted image data to a USB host controller 14. The recording controller 12 serves also to periodically obtain status information data from a recording unit 15 by controlling the USB host controller 14.

A USB function controller 13 executes communication control of a USB interface. More specifically, with protocol control according to the USB communication standards, the USB function controller 13 converts data based on a USB control task executed by the CPU 1 into a packet and then transmits the USB packet to an external information processing terminal via a CPU bus 18. Conversely, it also converts a USB packet from the external information processing terminal into data and then transmits the converted data to the CPU 1.

The USB host controller 14 is a controller for executing communication in accordance with protocols specified in the USB communication standards. The USB communication standards are capable of realizing high-speed data communication in two-way directions and connecting a plurality of hubs or functions (slaves) to one host (master). The USB host controller 14 has the host function in USB communication.

The recording unit 15 is a printing device, such as a laser beam printer or an ink jet printer, and it prints color image data or monochromatic image data on a material on which an image is to be printed. The recording unit 15 executes communication with the USB host controller 14 in accordance with protocols specified in the USB communication standards. In particular, the recording unit 15 has the function of a function (slave).

While a storage medium (not shown) is not limited to a memory card, this embodiment employs the memory card as the storage medium. Therefore, the facsimile has a memory card slot 16 into which a removable memory card is loaded. The memory card slot 16 is connected to the USB host controller 14 via a USB interface.

A storage medium controller 17 is able to access and read data files stored in the memory card that is loaded in the memory card slot 16.

First Embodiment

FIG. 2 is a flowchart of memory card data file processing employed in a first embodiment of the present invention.

First, the user operates the operation-display unit 8 and selects, from data files stored in the memory card, one to be processed (S21). The file type of the selected data file is determined based on, e.g., an extension suffixed to the file name (S22). Then, the selected data file is processed in the operation mode defined in a correspondence table (FIG. 3) in which the file type and the operation mode are registered beforehand in correspondent relation (S23).

Second Embodiment

FIG. 4 is a flowchart of memory card data file processing employed in a second embodiment of the present invention.

First, the user operates the operation-display unit 8 and selects, from data files stored in the memory card, one to be printed (S31). The file type of the selected data file is determined based on, e.g., an extension suffixed to the file name (S32).

Then, the selected data file is printed in the print mode defined in a correspondence table (FIG. 5) in which the file type and the print mode are registered beforehand in correspondent relation (S33).

The correspondence table between the file type and the print mode, shown in FIG. 5, is stored in a nonvolatile memory of the RAM 3 by registering the correspondence with the user operating the operation-display unit 8 beforehand, or by registering the file type and the print mode at the time when print of the data file in the preceding cycle has been completed.

Thus, according to the second embodiment, the operation mode to be used for processing the data file is registered, for example, by the user in correspondence to the file type of the data file. When the user selects one of the data files in the storage medium which is to be processed, the file type of the selected data file is determined and the selected data file can be processed in the operation mode corresponding to the determined file type. Therefore, once the operation mode to be used for processing is registered in correspondence to the file type of the data file, the processing desired by the user is executed just by selecting the data file. As a result, operability in processing data files stored in the storage medium, such as a memory card, can be improved.

Third Embodiment

FIG. 6 is a flowchart of memory card data file processing employed in a third embodiment of the present invention.

First, the user operates the operation-display unit 8 and selects the file type of one or more data files to be processed (S41). Data files stored in a memory card are searched, and one data file of the selected file type is extracted (S42). The extracted data file is processed in the operation mode defined in the correspondence table (FIG. 3) in which the file type and the operation mode are registered beforehand in correspondent relation (S43). Steps S42, S43 are repeated until search of all the data files in the memory card is completed (S44). Upon the completion of search of all the data files, the control flow is brought to an end.

The correspondence table between the file type and the operation mode, shown in FIG. 3, is stored in a nonvolatile memory (SRAM) of the RAM 3 by registering the correspondence with the user operating the operation-display unit 8 beforehand, or by registering the file type and the print mode at the time when processing of the data file in the preceding cycle has been completed.

Thus, upon selection of the file type of one or more data files which are stored in the storage medium and are to be processed, the storage medium is searched for the data files of the selected file type. The retrieved data files are all processed in the operation mode corresponding to the selected file type, whereby operability in processing the data files stored in the storage medium can be improved.

When the operation mode corresponding to the selected file type of the data file in the storage medium is not registered, the operation mode not registered at the time of the relevant processing operation is input in correspondence to the selected file type. This enables the operation mode corresponding to the selected file type to be registered at the same time as when the data file is processed in the corresponding operation mode.

Further, the print mode to be used for printing the data file is registered by the user in correspondence to the file type of the data file. When the user selects one of the data files in the storage medium which is to be printed, the file type of the selected data file is determined and the selected data file can be printed in the print mode corresponding to the determined file type. Therefore, once the print mode to be used for printing is registered in correspondence to the file type of the data file, the printing desired by the user is executed just by selecting the data file. As a result, operability in printing data files stored in the storage medium can be improved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-304927 filed Aug. 28, 2003, which is hereby incorporated by reference herein.

What is claimed is:

1. An image processing apparatus comprising:
   read means for reading a data file stored in a storage medium which is removably loaded into a body of said image processing apparatus;
   inputting means for inputting a file type of a data file by user operation;
   determining means for searching the data file having the file type input by inputting means and determining the data file read out of said storage medium;
   first registering means for registering the file type of the data file and an associated printing mode in correspondent relation of the file type of the data file selected from among a plurality of printing modes including a print resolution mode for the data file of the file type; and
   processing control means for executing the associated printing mode corresponding to the determined file type in accordance with details registered by the first registering means.

2. An image processing apparatus according to claim 1, further comprising:
   selecting means for selecting, from said storage medium, the data file to be processed.

3. An image processing apparatus according to claim 1, further comprising:
   printing means for printing the data file in said storage medium on a recording medium; and
   selecting means for selecting, from said storage medium, the data file to be processed,
   wherein when the data file to be processed is selected, the file type of the selected data file is determined and the selected data file is printed in the print mode corresponding to the determined file type.

4. An image processing apparatus according to claim 1, wherein when the printing mode corresponding to the file type of the data file selected from the storage medium is not registered, the printing mode not registered at the time of the relevant processing operation is input in correspondence to the file type of the selected data file, and the printing mode corresponding to the file type of the selected data file is registered at the same time as when the data file is processed.

5. An image processing apparatus according to any one of claims 1 to 4, wherein the file type of the data file in said storage medium is determined based on an extension of the data file.

* * * * *